United States Patent
Chung et al.

(10) Patent No.: US 10,909,261 B2
(45) Date of Patent: Feb. 2, 2021

(54) METHOD AND COMPUTER PROGRAM PRODUCT FOR GENERATING SECURE ALTERNATIVE REPRESENTATION FOR NUMERICAL DATUM

(71) Applicant: INDUSTRIAL TECHNOLOGY RESEARCH INSTITUTE, Chutung (TW)

(72) Inventors: Shen-Ming Chung, Minxiong Township (TW); Tzi-Cker Chiueh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 287 days.

(21) Appl. No.: 16/217,931

(22) Filed: Dec. 12, 2018

(65) Prior Publication Data

US 2020/0193050 A1 Jun. 18, 2020

(51) Int. Cl.
*G06F 21/60* (2013.01)
*G06F 21/62* (2013.01)
(Continued)

(52) U.S. Cl.
CPC ........ *G06F 21/6227* (2013.01); *G06F 21/602* (2013.01); *H04L 9/002* (2013.01);
(Continued)

(58) Field of Classification Search
CPC .............. G06F 21/602; G06F 21/6227; G06F 2221/2107; G06F 21/6209; G06F 21/6245;
(Continued)

(56) References Cited

U.S. PATENT DOCUMENTS 4,099,242 A * 7/1978 Houston ........... G06F 16/90344
5,852,821 A * 12/1998 Chen ................. G06F 16/24556
(Continued)

FOREIGN PATENT DOCUMENTS

CN 102916963 A 2/2013
CN 103118089 A 5/2013
(Continued)

OTHER PUBLICATIONS

Agrawal et al., "Order Preserving Encryption for Numeric Data", SIGMOD Jun. 13-18, 2004, Paris, France, Total 12 pages.
(Continued)

*Primary Examiner* — Olugbenga O Idowu
(74) *Attorney, Agent, or Firm* — Birch, Stewart, Kolasch & Birch, LLP

(57) ABSTRACT

A method for generating secure alternative representation for a numerical datum, being performed in a processing system comprising a processing unit coupled to a storage unit, is provide. The method comprises: receiving the numerical datum; providing a plurality of semi-finished conditions; associating each of the semi-finished conditions with one or more secret parameters to form a plurality of secret conditions; for each of the secret conditions: determining whether the numerical datum satisfies the secret condition; outputting a first character as a result element if the numerical datum satisfies the secret condition; and outputting a second character as the result element if the numerical datum does not satisfy the secret condition; and concatenating each result element being output corresponding to the secret conditions as an alternative representation for the numerical datum.

16 Claims, 5 Drawing Sheets

(51) Int. Cl.
*H04L 9/00* (2006.01)
*H04L 9/08* (2006.01)

(52) U.S. Cl.
CPC .......... *H04L 9/0869* (2013.01); *H04L 9/0894* (2013.01); *G06F 2221/2107* (2013.01); *H04L 2209/08* (2013.01)

(58) Field of Classification Search
CPC ... H04L 2209/08; H04L 9/002; H04L 9/0869; H04L 9/0894
See application file for complete search history.

(56) References Cited

U.S. PATENT DOCUMENTS

| | | | |
|---|---|---|---|
| 7,373,500 | B2 | 5/2008 | Ramelson et al. |
| 8,694,646 | B1 | 4/2014 | Kothari et al. |
| 8,726,398 | B1 | 5/2014 | Tock et al. |
| 8,812,867 | B2 | 8/2014 | Jho et al. |
| 9,774,578 | B1 | 9/2017 | Ateniese et al. |
| 10,200,196 | B1 | 2/2019 | Rodriguez De Castro |
| 2009/0113213 | A1 | 4/2009 | Park et al. |
| 2010/0042846 | A1 | 2/2010 | Trotter et al. |
| 2011/0164746 | A1* | 7/2011 | Nice .................. G06F 21/6263 380/30 |
| 2014/0129567 | A1 | 5/2014 | Araki et al. |
| 2014/0143549 | A1 | 5/2014 | Araki et al. |
| 2014/0331044 | A1 | 11/2014 | Fujii et al. |
| 2016/0140179 | A1 | 5/2016 | Yuen |
| 2016/0366113 | A1 | 12/2016 | Dawoud |
| 2017/0078251 | A1 | 3/2017 | Grubbs |
| 2017/0099262 | A1 | 4/2017 | Kerschbaum |

FOREIGN PATENT DOCUMENTS

| | | |
|---|---|---|
| CN | 105681280 A | 6/2016 |
| CN | 104731860 B | 11/2017 |
| CN | 107426075 A | 12/2017 |
| EP | 1939785 A2 | 7/2008 |
| TW | 333630 B | 5/1986 |
| TW | I381696 B | 1/2013 |
| TW | 201411393 A | 3/2014 |
| TW | 201426684 A | 7/2014 |
| TW | 201830283 A | 8/2018 |
| WO | WO 2017/139761 A1 | 8/2017 |

OTHER PUBLICATIONS

Boldyreva et al., "Order-Preserving Symmetric Encryption", A preliminary version of this paper appears in Advances in Cryptology—EUROCRYPT 2009, 28th, Annual International Cryptology Conference, A. Joux ed., LNCS, Springer, 2009, Total 28 pages.

Chunsheng et al., "Known-plaintext attack on secure kNN computation on encrypted databases", Security Comm. Networks 2014, vol. 7, pp. 2432-2441.

Curtmola et al., "Searchable Symmetric Encryption: Improved Definitions and Efficient Constructions", A preliminary version of this article appeared in the 13th ACM Conference on Computer and Communications Security (CCS '06) [20], Total 33 pages.

European Search Report of application 18161234.2 dated Sep. 11, 2018.

Fan et al., "Prefix-preserving IP address anonymization: measurement-based security evaluation and a new cryptography-based scheme", Computer Networks 2004, vol. 46, pp. 253-272.

Goh, "Secure Indexes", A early version of this paper first appeared on the Cryptology ePrint Archive on Oct. 7th, 2003, Total 18 pages.

Hacigümüş et al., "Executing SQL over Encrypted Data in the Database-Service-Provider Model", ACM SIGMOD 'Jun. 4-6, 2002, Madison, Wisconsin, USA, Total 12 pages.

Hore et al., "A Privacy-Preserving Index for Range Queries", Proceedings of the 30th VLDB Conference, Toronto, Canada, 2004, pp. 720-731.

Li et al., "Fast and Scalable Range Query Processing With Strong Privacy Protection for Cloud Computing", IEEE/ACM Transactions on Networking, vol. 24, No. 4, Aug. 2016, pp. 2305-2318.

Office Action issued by TIPO dated Sep. 25, 2018.

Rezapour et al., "Efficient Common Prefix Search on Encrypted Data as an Additional Service on the Top of the Storage Providers", IEEE Computer Society, 2015, pp. 975-981.

Song et al., "Practical Techniques for Searches on Encrypted Data", 2000, Total 12 pages.

Wang et al., "Generalized Pattern Matching String Search on Encrypted Data in Cloud Systems", 2015 IEEE Conference on Computer Communications, pp. 2101-2109.

Wong et al., "Secure kNN Computation on Encrypted Databases", SIGMOD 2009, total 14 pages.

Taiwanese Office Action and Search Report, dated Apr. 24, 2020, for Taiwanese Apptication No. 108109842.

U.S. Office Action, dated Jun. 2, 2020, for U.S. Appl. No. 15/847,298.

* cited by examiner

US 10,909,261 B2

METHOD AND COMPUTER PROGRAM PRODUCT FOR GENERATING SECURE ALTERNATIVE REPRESENTATION FOR NUMERICAL DATUM

TECHNICAL FIELD

The application relates to a method and a computer product for generating secure alternative representation, especially to a method and a computer product for generating secure alternative representation for numerical datum.

BACKGROUND

Cloud applications are around those who connect themselves to the cyberspace, when search engines have already become inevitable tools and cloud storage services also have been attracting a vast number of users experiencing extraordinary mobility, scalability and availability for free. However, users do pay for these benefits in term of their privacy.

Being aware of possible infringements made by hackers or service providers, users are increasingly demanding their privacy. In order to avoid personal information leakage, data are suggested to be encrypted before being stored in one or more corresponding servers in cloud. Nevertheless, encrypted data may make the searching for particular data hard, if not impossible, and thus results in inconvenience during searching and/or retrieving data stored in the corresponding server(s). Based on the above considerations, how to provide a secure yet easy-to-search data retrieval mechanism is one of the subjects of industry efforts.

SUMMARY

An embodiment of the present application discloses a method for generating secure alternative representation for a numerical datum, being performed in a processing system comprising a processing unit coupled to a storage unit. The method comprises: receiving, by the processing system, the numerical datum; providing, by the processing system, a plurality of semi-finished conditions; associating, by the processing system, each of the semi-finished conditions with one or more secret parameters to form a plurality of secret conditions; for each of the secret conditions: determining, by the processing system, whether the numerical datum satisfies the secret condition; outputting, by the processing system, a first character as a result element if the numerical datum satisfies the secret condition; and outputting, by the processing system, a second character as the result element if the numerical datum does not satisfy the secret condition; and concatenating, by the processing system, each result element being output corresponding to the secret conditions as an alternative representation for the numerical datum.

Another embodiment of the present application discloses a computer program product comprising a non-transitory computer readable medium having a computer readable program stored therein. When the computer readable program is executed at a processing unit of a processing system, causes the processing system to perform steps comprising: receiving a numerical datum; providing a plurality of semi-finished conditions; associating each of the semi-finished conditions with one or more secret parameters to form a plurality of secret conditions; for each of the secret conditions: determining whether the numerical datum satisfies the secret condition; outputting a first character as a result element if the numerical datum satisfies the secret condition; and outputting a second character as the result element if the numerical datum does not satisfy the secret condition; and concatenating each result element being output corresponding to the secret conditions as an alternative representation for the numerical datum.

The above and other aspects of the invention will become better understood with regard to the following detailed description of the preferred but non-limiting embodiment(s). The following description is made with reference to the accompanying drawings.

DETAILED DESCRIPTION

Figure 1:
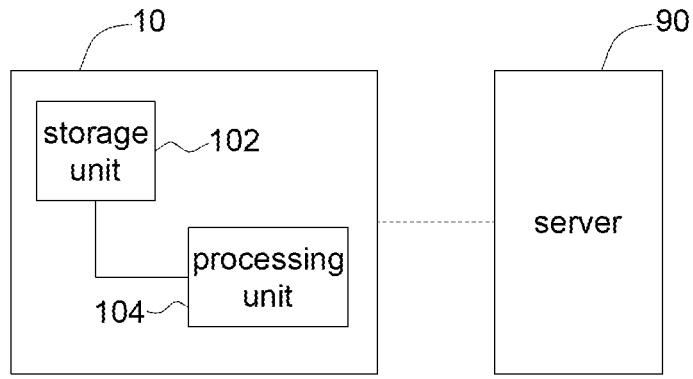
FIG. 1 shows a block diagram of a processing system according to an embodiment of the present application.

Referring to FIG. 1, FIG. 1 shows a block diagram of a processing system according to an embodiment of the present application. The processing system 10 includes one (or more) storage unit 102 and one (or more) processing unit 104. The storage unit 102 is configured to store data, applications, procedures, computer readable instructions or computer readable programs which are configured for generating alternative representations for numerical data. The processing unit 104 is configured to execute the applications, the procedures, the computer readable instructions or the computer readable programs to perform the method for generating alternative representation. In some embodiments, a computer program product comprising a non-transitory computer readable medium may be employed to store applications, procedures, computer readable instructions or computer readable programs. When the applications, the procedures, the computer readable instructions or the computer readable programs is/are executed on the processing system 10, it causes the processing system 10 to perform the method for generating alternative representations.

In the present application, one or more alternative representations can be generated for a numerical datum which may be a numerical value (e.g., a real number) or a numerical range (e.g., [a,b] or (a,b), where a and b are real numbers). In an embodiment, the numerical datum may be included in a document, a table, or a file, for example, stating a financial statement of a company. The data owner (user) may expect to hide the numerical datum before storing the numerical datum (or the document, table or file including the numerical datum) into a remote storage space in a server 90. In this situation, before storing the numerical datum into a remote storage space in a server 90, the method according to the present application is able to generate one or more alternative representations used as a secure index or secure indexes representing the numerical datum while hiding its actual content. In another embodiment, when the data owner (user) needs to identify the previous generated secure index or secure indexes stored in the remote storage space and/or wants to retrieve the associated encrypted numerical datum, an input numerical datum such as a numerical range may be used as a query, and the method according to the present application may be used to generate one or more alternative representations used as a secure trapdoor or secure trapdoors to identify the secure index or secure indexes.

For the exemplary purpose, a data retrieval mechanism can be enabled by the method which generates one or more secure indexes for each of private or confidential objects, such as files, documents and tables, before doing encryption over these objects in user-side; after uploading the encrypted object and the associated secure index or secure indexes to a server, one can retrieve wanted encrypted objects from the server if a matching secure trapdoor could be provided as a clue to identify the associated secure index(es).

The processing system 10 may be implemented by a cellphone, a personal computer, a laptop, a smart phone, a tablet, or any device with computation function and a network connection. For example, the processing system 10 is able to be connected to a server 90, and send the generated alternative representations used as secure indexes to the server 90 and thus store the alternative representations in the server 90. Also, the processing system 10 may send the generated alternative representations used as secure trapdoors to the server 90 to search desired index(es) among the secure indexes stored in the server 90.

In the embodiment, since the numerical datum is transformed into an alternative representation which is used as a secure index instead of the numerical datum to store into the server 90, the server 90 cannot observe the actual content of the numerical datum from the secure index. Similarly, when searching, since the numerical datum which is used as query is transformed into an alternative representation which is used as a secure trapdoor instead of the numerical datum, the server 90 cannot observe the actual content of the numerical datum from the secure trapdoor either.

Figure 2:
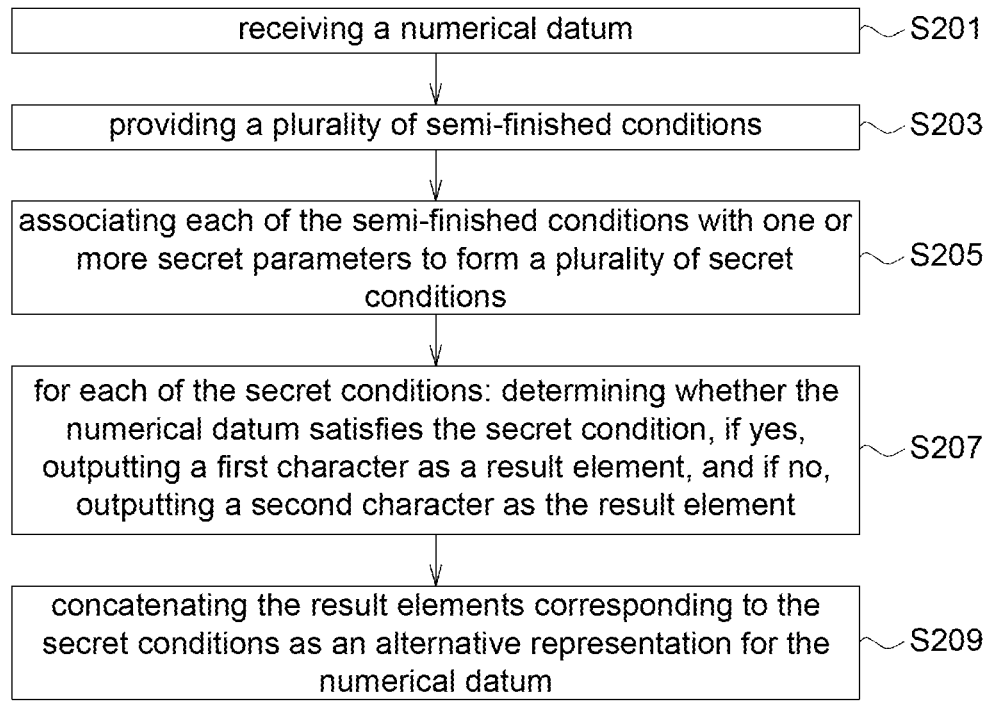
FIG. 2 shows a flowchart of a method for generating secure alternative representation according to an embodiment of the present application.

Referring to FIG. 2, the method in FIG. 2 includes steps S201~S209. In this embodiment, the method shown in FIG. 2 is used for generating alternative representation which may be used as a secure index. Also referring to FIG. 3 which illustrates an example of generating an alternative representation for a numerical datum according to the present application.

In step S201, the processing unit 104 receives a numerical datum. In this example, the numerical datum is a numerical value, that is, 35. The numerical datum may be input by a user or stored in the storage unit 102 of the processing system 10.

In step S203, the processing unit 102 provides a plurality of semi-finished conditions. In this example, the semi-finished conditions are ">", "(,)", ",]", ">", "~[,)", "≤", "~[,]" and "~(,)", where ">" refers to "larger than", "(,)" refers to "within the range (the upper bound and the lower bound are not included in the range)", "(,]" refers to "within the range (the lower bound is not included in the range)", "~[,)" refers to "not within the range (the upper bound is not included in the range)", "≤" refers to "less than or equal to", "~[,]" refers to "not within the range", and "~(,)" refers to "not within the range (the upper bound and the lower bound are not included in the range)".

In an embodiment, the semi-finished conditions are selected randomly from a set of semi-finished conditions, which may include semi-finished conditions such as ">", "<", "=", "≥", "≤", "≠","(,)", "[,]", "(,]", "[,)", "~(,)", "~[,]", "~(,]", "~[,)" and so on.

In step S205, the processing unit 104 associates each of the semi-finished conditions with one or more secret parameters to form a plurality of secret conditions. In this example, the secret parameters are 89, 12, 42, 8, 67, 22, 57, 91 67, 24, 58, 104 and 76. For the first semi-finished condition ">" (the leftmost one), the secret parameter "89" is associated with, by the processing unit 104, and then the secret condition ">89" is formed, wherein ">89" refers to "lager than 89". For the second semi-finished condition "(,)", the secret parameter "12" and "42" are associated with, by the processing unit 104, and then the secret condition "(12,42)" is formed, wherein "(12,42)" refers to "lager than 12 and less than 42". For the fifth semi-finished condition "~[,)", the secret parameter "57" and "91" are associated with, by the processing unit 104, and then the secret condition "~[57, 91)" is formed, wherein "~[57,91)" refers to "less than 57 or, larger or equal to 91". Other secret conditions are formed in the same way.

Noted that, although the secrets parameters in the example are integers, it is possible that the secret parameters are real numbers in practice. In some embodiments, a single semi-condition can be associated with more than two secret parameters. For example, for a semi-finished condition "~[,], ~[,]" which refers to "neither within a first range nor within a second range"", the processing unit may associate four secret parameters, for example, 10, 20, 30 and 40, with the semi-finished condition to form a secret condition "~[10, 20], ~[30,40]" which refers to "less than 10, or larger than 20 and less than 30, or larger than 40".

In this embodiment, each secret parameter is generated randomly within a range with a minimum value and a maximum value such as [1,150] so as to efficiently represent data within specific range, such as age and body weight, wherein the minimum value and the maximum value may be real numbers. However, in another embodiment, the secret parameter(s) can be generated randomly with no bound.

In step S207, for each of the secret conditions, the processing unit 104 determines whether the numerical datum satisfies the secret condition. If the numerical datum satisfies the secret condition, the processing unit 104 outputs a first character as a result element; If the numerical datum does not satisfy the secret condition, the processing unit 104 outputs a second character as the result element. In this example, the first character is "1", and the second character is "0". For the first secret condition ">89", since 35 is not larger than 89, the processing unit 104 determines that the numerical datum "35" does not satisfy the secret condition ">89", and outputs the second character "0" as the result element corresponding to the secret condition ">89". For the second secret condition "(12,42)", since 35 is larger than 12 and less than 42, the processing unit 104 determines that the numerical datum "35" satisfies the secret condition "(12,42)", and outputs the first character "1" as the result element corresponding to the secret condition "(12,42)". Same procedure is applied to other secret conditions.

In step S209, the processing unit 104 concatenates the result element being output corresponding to the secret conditions as an alternative representation for the numerical datum. In this example, the alternative representation for the numerical datum is "01111101".

With the process illustrated above, the numerical datum "35" is "transformed" into the alternative representation "01111101" which can hide the actual information of the numerical datum from the server 90, as long as the secret conditions are not revealed to the server 90. Namely, the alternative representation can be stored into a remote server without revealing the confidential or private information.

In the following embodiment, the method shown in FIG. 2 is used for generating alternative representation which may be used as a secure trapdoor. Also referring to FIG. 4 which illustrates another example of generating an alternative representation for a numerical datum according to the present application. In this case, the situation may be that a user intends to search for one or more desired numerical values within a numerical range among the alternative representations of numerical data stored in a remote server.

Figure 4:
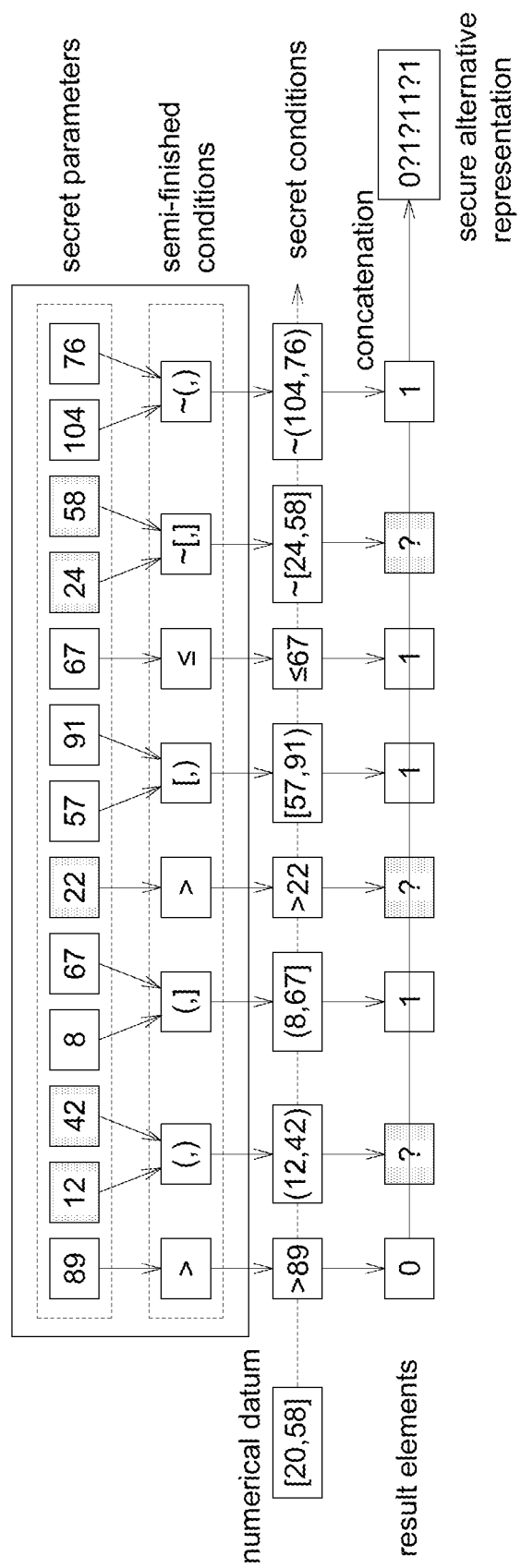
FIG. 4 shows another example of generating an alternative representation for a numerical datum according to the present application.

In the example shown in FIG. 4, the numerical datum is a numerical range, that is, [20, 58] which refers to "one or more desired numerical values within the range of 20~58". For the numerical range, steps S201~S205 and S209 are similar to the above embodiment, but step S207 is modified to fit the input of numerical range. Specifically, step S207 further includes: outputting a third character if it is unable to determine whether the numerical datum satisfies the secret condition, specifically, if it is not true that all desired numerical values within the numerical range satisfy the secret condition. For example, for the first secret condition ">89", since the numerical values within the range [20,58] is all less than 89, the processing unit 104 determines that the numerical datum "[20,58]" does not satisfy the secret condition ">89", and outputs the second character "0". For the second secret condition "(12,42)", since not all desired numerical values within the range [20,58] are within the range of (12,42) (for example, a desired numerical value 52 is within [20,58] but is not within (12,42), and thus the secret condition is not satisfied), the processing unit 104 outputs the third character, for example but not be limited to, "?", as the result element. Other result elements are also output in the same way, as provided in the example in FIG. 4. The third character may be one of other characters different from the first character and the second character, or may even encoded in other readable forms. After the result elements corresponding to all the secret conditions are output, the processing unit 104 concatenates each result element being output as a secure alternative representation, that is, in this example, "0?1?11?1" for the numerical datum "[20,58]". The alternative representation "0?1?11?1" for the numerical datum "[20,58]" may be used as a secure trapdoor and uploaded to the remote server for searching desired numerical values without leaking the actual numerical range.

Figure 3:
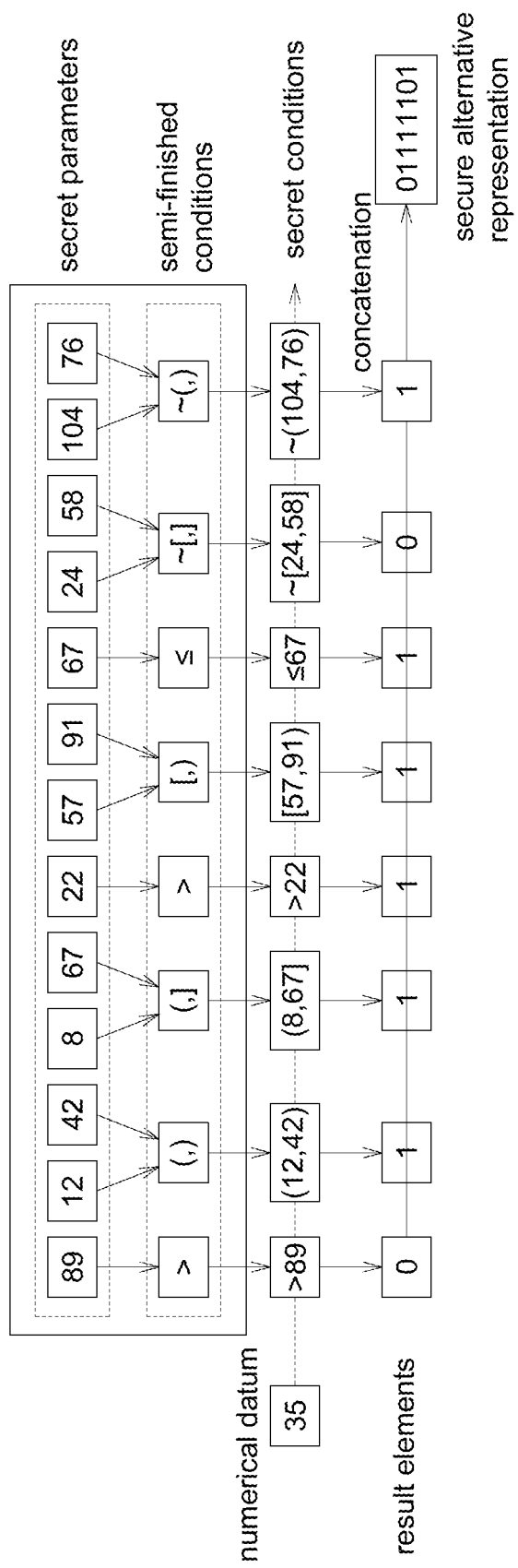
FIG. 3 shows an example of generating an alternative representation for a numerical datum according to the present application.

Looking back to FIG. 3, where 35 is represented by "011111101", one can readily see that the secure alternative representation "0?1?11?1" for [20,58] can result in a matching, if "?" is interpreted as a symbol that represents any character. Namely, the sequence "0?1?11?1", when used as a secure trapdoor can represent the sequence "011111101" and thus can be used to identify the sequence "011111101", that is used as a secure index.

In some embodiments, each third character in the alternative representation is removed from the alternative representation, if there is any third character being output (there may be no third character, only one third character or more than one third character being output as the result element), so that the final alternative representation is free of the third character, such as "01111" for the example in FIG. 4. In another embodiment, each third character is excluded if there existed any third character being output as result element, when the processing unit concatenates the result elements.

Looking back to FIG. 3, where 35 is represented by "011111101", one can readily see that the third-character-free secure alternative representation "01111" for [20,58] is a subsequence of the "011111101" for 35, thus leads to a matching. Namely, the sequence "01111" used as a secure trapdoor can also be used to identify the sequence "011111101" used as a secure index.

Figure 5:
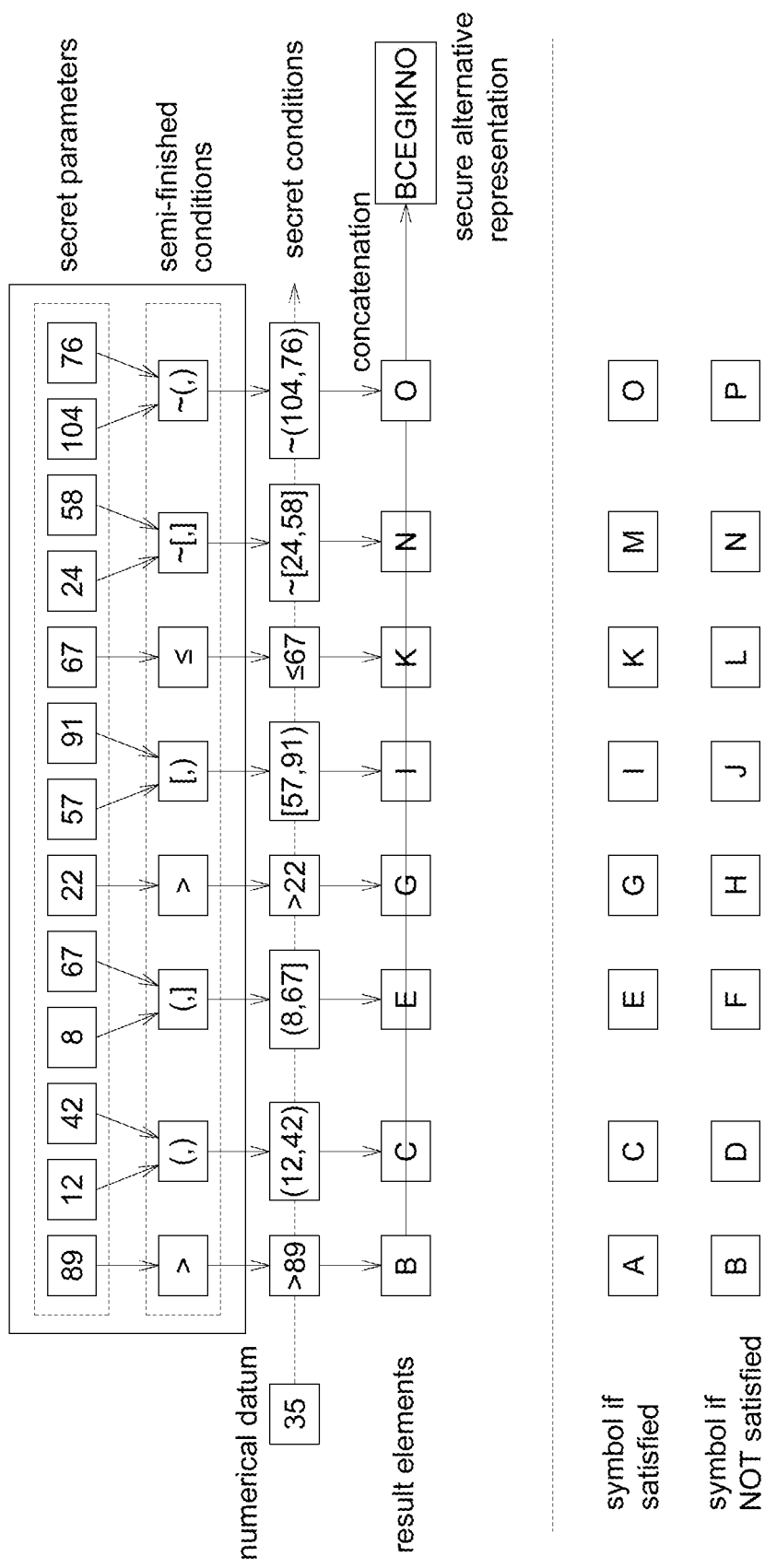
FIG. 5 shows yet another example of generating an alternative representation for a numerical datum according to the present application.

In some embodiments, the pair of first character and the second character may be different per secret condition. As shown in FIG. 5, the pair of first character and the second character for the left-most secret condition is {"A", "B"} while the other pairs are {"C", "D"}, {"E", "F"} and so on. In such embodiments, each secure alternative representation comprises more diverse characters and looks more like a random sequence. For example, the secure alternative representation "BCEGIKNO" is generated for 35, instead of a binary sequence, and may be used as a secure index as well.

Figure 6:
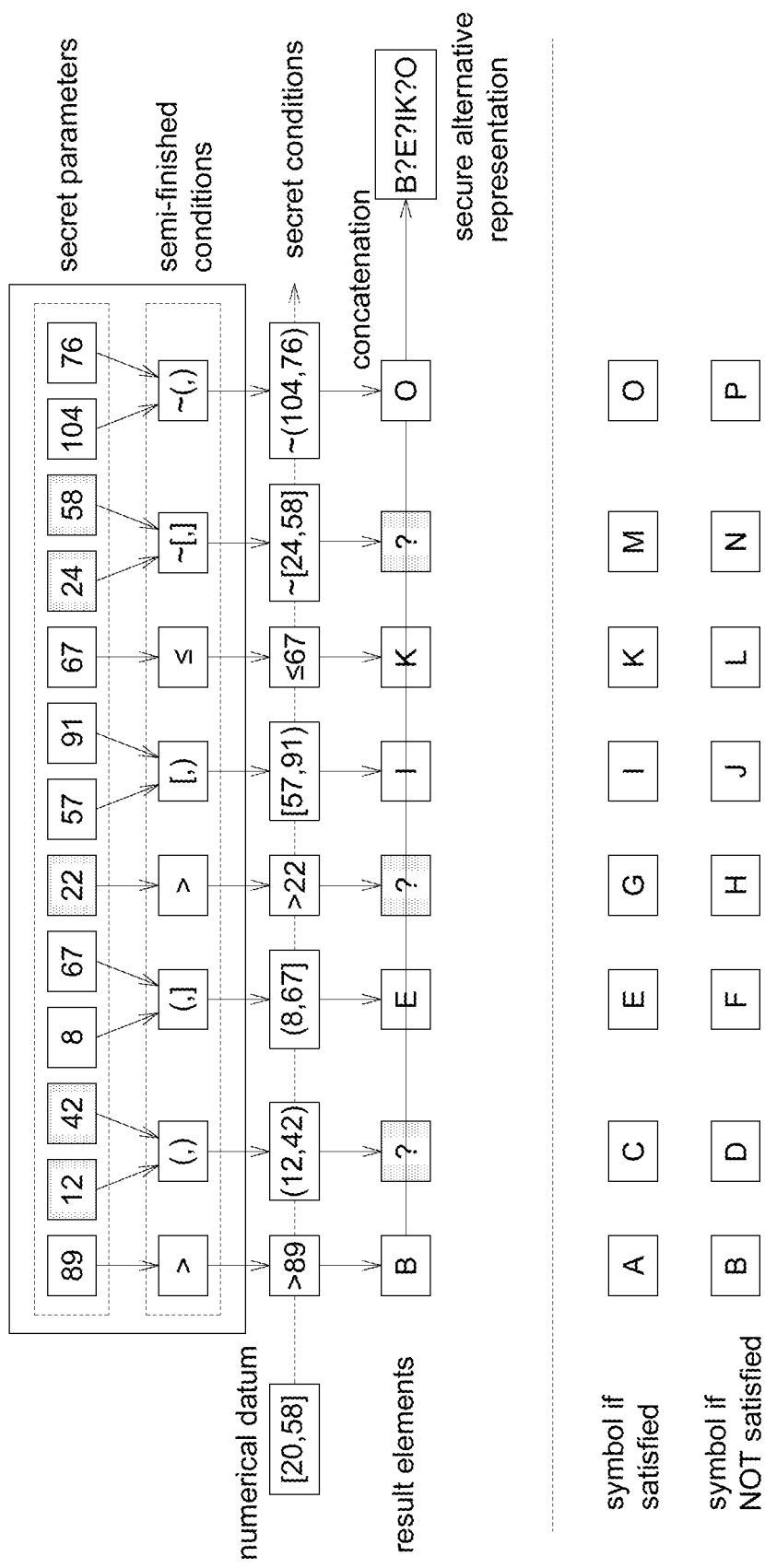
FIG. 6 shows yet another example of generating an alternative representation for a numerical datum according to the present application.

Similarly, for such embodiments, as shown in FIG. 6, one can generate a secure alternative representation for a numerical range, e.g. [20,58], which comprises more diverse characters. That is, when generating a secure trapdoor, if we use the same secret conditions and the same pairs of first character and second character as shown in FIG. 5, a secure alternative representation "B?E?IK?O" is generated for [20, 58] which can be used to identify the secure alternative representation "BCEGIKNO". In some embodiment, the third character is removed (or excluded during the processing of concatenation) if any third character being output, so the generated secure alternative representation is third-character-free. For example, in such embodiments, "BEIKO" is generated and because it is a subsequence of "BCEGIKNO", this property leads to a matching and the third-character-free secure alternative representation can be used as a secure trapdoor.

That is, a pair of the first character and the second character corresponding to one of the secret conditions is different from at least one pair of the first character and the second character corresponding to other secret conditions except self, so that the generated alternative representation for the numerical datum may look more like a random sequence (rather than a binary sequence). Comparing to binary sequence, such embodiments make matching against secure indexes more efficiently without the assistance of any third character appearing in secure trapdoors.

With the present application, numerical data can be transformed into secure alternative representations and then be stored into a remote server. When a user intends to search the numerical data which stored in the remote server, the query of a numerical range may also be transformed into a secure alternative representation used as a secure trapdoor and uploaded to the remote server for searching. Since it is difficult for the remote server or malicious person to find the actual value (or numerical range) from the alternative representations, the confidentiality of the private information of the numerical data is preserved. As the numerical datum can be a numerical range, the present application supports range queries.

While the invention has been described by way of examples and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for generating secure alternative representation for a numerical datum, being performed in a processing system comprising a processing unit coupled to a storage unit, comprising:
   receiving, by the processing system, the numerical datum;
   providing, by the processing system, a plurality of semi-finished conditions;
   associating, by the processing system, each of the semi-finished conditions with one or more secret parameters to form a plurality of secret conditions;
   for each of the secret conditions:
      determining, by the processing system, whether the numerical datum satisfies the secret condition;
      outputting, by the processing system, a first character as a result element if the numerical datum satisfies the secret condition; and
      outputting, by the processing system, a second character as the result element if the numerical datum does not satisfy the secret condition; and
   concatenating, by the processing system, said result element being output corresponding to the secret conditions as an alternative representation for the numerical datum.

2. The method according to claim 1, wherein the secret parameters are generated according to a range with a minimum value and a maximum value.

3. The method according to claim 1, wherein the secret parameters are generated randomly.

4. The method according to claim 1, wherein the numerical datum is a numerical range.

5. The method according to claim 4, further comprising:
   outputting, by the processing system, a third character as the result element if it is unable to determine whether the numerical datum satisfies the secret condition.

6. The method according to claim 5, wherein during the concatenating, by the processing system, said third character is excluded if any third character being output.

7. The method according to claim 5, further comprising:
   removing, by the processing system, said third character if there exists any third character being output as said result element.

8. The method according to claim 1, wherein a pair of the first character and the second character corresponding to one of the secret conditions is different from at least one pair of the first character and the second character corresponding to other secret conditions except self.

9. A computer program product comprising a non-transitory computer readable medium having a computer readable program stored therein, wherein the computer readable program, when executed at a processing unit of a processing system, causes the processing system to perform steps comprising:
   receiving a numerical datum;
   providing a plurality of semi-finished conditions;
   associating each of the semi-finished conditions with one or more secret parameters to form a plurality of secret conditions;
   for each of the secret conditions:
      determining whether the numerical datum satisfies the secret condition;
      outputting a first character as a result element if the numerical datum satisfies the secret condition; and
      outputting a second character as the result element if the numerical datum does not satisfy the secret condition; and
   concatenating said result element being output corresponding to the secret conditions as an alternative representation for the numerical datum.

10. The computer program product according to claim 9, wherein the secret parameters are generated according to a range with a minimum value and a maximum value.

11. The computer program product according to claim 9, wherein the secret parameters are generated randomly.

12. The computer program product according to claim 9, wherein the numerical datum is a numerical range.

13. The computer program product according to claim 12, wherein the computer readable program, further causes the processing system to perform steps comprising:
   outputting a third character as the result element if it is unable to determine whether the numerical datum satisfies the secret condition.

14. The computer program product according to claim 13, wherein during the concatenating, said third character is excluded if any third character being output as said result element.

15. The computer program product according to claim 13, wherein the computer readable program, further causes the processing system to perform steps comprising:
   removing said third character if there exists any third character being output as said result element.

16. The computer program product according to claim 9, wherein a pair of the first character and the second character corresponding to one of the secret conditions is different from at least one pair of the first character and the second character corresponding to other secret conditions except self.

* * * * *